C. W. WEISS.
INTERNAL COMBUSTION ENGINE.
APPLICATION FILED OCT. 14, 1907.
921,035.
Patented May 11, 1909.
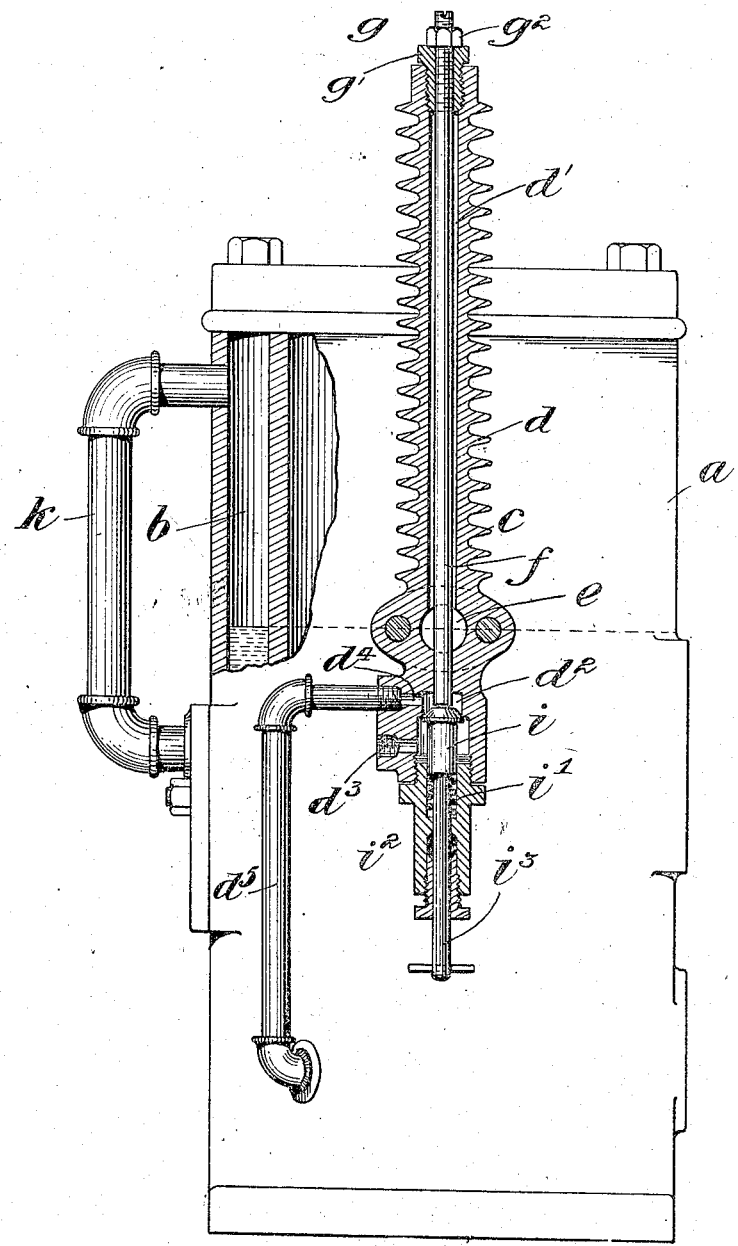
Attest:
Inventor:
Carl W. Weiss
by Reddington Iddle Greeley
Att'ys United States Patent Office.

CARL W. WEISS, OF NEW YORK, N. Y.

INTERNAL-COMBUSTION ENGINE.

No. 921,035.    Specification of Letters Patent.    Patented May 11, 1909.

Application filed October 14, 1907. Serial No. 397,282.

*To all whom it may concern:*

Be it known that I, CARL W. WEISS, a citizen of the United States, residing in the borough of Manhattan, of the city of New York, in the State of New York, have invented certain new and useful Improvements in Internal-Combustion Engines, of which the following is a specification, reference being had to the accompanying drawing, forming a part hereof.

This invention relates to internal combustion engines in which the cylinders are water jacketed. It is generally desirable to regulate the supply of cooling water to the water jacket of such an engine, especially when the steam generated in the water jacket is discharged into the working cylinder.

The regulation of the water supply has been effected usually, heretofore, by a float valve which acts in the usual manner to maintain the water in the water jacket at a predetermined level. The float valve and its connections necessarily occupy considerable space, which is objectionable in some installations and are usually not practicable when the engine is mounted upon a moving base.

It is therefore the object of the present invention to provide means for regulating the supply of water to the water jacket which shall occupy but little space and shall not be affected by the position of the engine cylinder or by movement of the engine. In accordance with the invention the valve through which the cooling water is admitted is controlled by a thermostatic device, which is in such relation to the water jacket as to operate to open the valve when the supply of water in the water jacket falls substantially below a predetermined level and to close the valve when the water rises therein substantially above a predetermined level, but is not itself in direct communication with the valve chamber and does not permit circulation of water or steam through itself.

The invention will be more fully explained hereinafter with reference to the accompanying drawing, in which the single figure represents, partly in elevation and partly in section, an engine cylinder equipped with the present improvement.

The drawing shows a vertical cylinder $a$ of an internal combustion engine, of ordinary construction, the cylinder being water jacketed as indicated at $b$. Suitably secured to the cylinder wall is a device which comprises, in the construction shown, a thermostat $c$ and a valve controlled thereby for the purpose of regulating the admission of cooling water to the water jacket. As shown, the thermostat comprises a radiating shell or tube $d$ which communicates, as through a port $e$, with the water jacket at about the level at which it is desired to maintain the water in the jacket, a thermostat rod $f$, and suitable regulating devices $g$ therefor. As shown, the rod is threaded in a sleeve nut $g'$ seated in the shell $d$ and is provided with a suitable jam nut $g^2$. The chamber $d'$ within the tube or shell $d$ is of substantially greater diameter than the rod $f$ so as to afford substantial space about the same. At the lower end of the tube or shell $d$ is formed a valve chamber $d^2$ into which the rod $f$ projects with a sliding fit in the wall which separates the chamber $d^2$ from the port $e$, so that there is practically no passage of steam or water between the valve chamber and such port. A valve $i$ is mounted in the valve chamber $d^2$ and is held normally to its seat by a spring $i'$ in the stuffing box $i^2$. The stem $i^3$ of the valve $i$ projects beyond the stuffing box so as to permit the valve to be opened by hand when required.

The inlet $d^3$ for the cooling water communicates with the valve chamber $d^2$ at one side of the valve $i$ and the cooling water is conducted from the valve chamber, when the valve is open, through a port $d^4$ on the other side of the valve $i$ and by a suitable pipe $d^5$ to the water jacket at or near the lower end or side thereof. Provision is made in the engine shown for the conduction of steam from the upper end of the water jacket, through a pipe $k$ to the working cylinder of the engine, as usual in engines of the particular style indicated in the drawing.

When the engine is cold the valve $i$ is pulled from its seat by hand until the water jacket is filled to a predetermined level, with which the position of the port $e$ corresponds, the valve being then allowed to close. As the engine is heated up and the level of the water is lowered, through loss by evaporation or otherwise, (whether the steam which may be generated is conducted into the working cylinder or not) until the port $e$ is exposed, steam enters the chamber $d'$ of the thermostat and, being at a temperature higher than that of the water, which was cooled by radiation from the walls of the chamber, there being no circulation through the chamber, causes the rod $f$ to expand and to push the valve $i$ from its seat, whereby more cooling water is admitted to the jacket. As soon as the level of the water in the jacket is raised sufficiently to cover the port $e$ the steam in the chamber $d'$ is quickly condensed through the reduction of temperature by radiation and the chamber fills with water which is quickly cooled by radiation. The rod $d$ is thereby caused to contract sufficiently to permit the valve $i$ to be closed by its spring $i'$. In this manner the level of the water in the water jacket is maintained always approximately near the predetermined level. It will be understood that through the adjusting devices $g$, the expansion rod $d$ is adjusted so as to cause the valve $i$ to open or close as soon as the conditions are established which require the supply of additional cooling water or the cutting off of such supply.

It will be observed that the interior of the thermostatic device communicates with the water jacket at the water level but has no direct communication with the valve chamber, while its end is closed so as to permit no circulation through it. This construction and arrangement provides for the maintenance of the water in the jacket at the predetermined level and permits the device to be applied to engines in which the steam generated in the water jacket is made use of in the engine.

It will be obvious that the cylinder and the water regulating devices thereon can be arranged in any convenient position and that the operation of such devices is not affected by any moderate movement of the engine from its normal position. It will also be understood that the thermostatic devices might be of any usual or suitable construction and arrangement and that the invention is not limited to the precise details of construction and arrangement shown and described herein.

I claim as my invention:

1. The combination of a water jacketed cylinder, means for supplying cooling water thereto, a valve to control the admission of the cooling water and a chambered thermostatic valve controlling device, the chamber of said device communicating with the water jacket at the water level, and closed to prevent circulation through it, the passage of fluid directly between the valve chamber and the chamber of the thermostatic device being prevented.

2. The combination of a water jacketed cylinder, means for supplying cooling water thereto, a valve to control the admission of the cooling water and a thermostatic valve controlling device comprising a chambered shell and an expanding member in said shell and in operative relation to the said valve, the chamber of the thermostatic device communicating with water jacket at the approximately predetermined water level and being closed to prevent circulation through it, the passage of fluid directly between the valve chamber and the chamber of the thermostatic device being prevented.

3. The combination of a water jacketed cylinder, means for supplying cooling water thereto, a valve to control the admission of the cooling water and a thermostatic valve controlling device comprising a thermostat shell uniting with the water jacket through a port at approximately the predetermined level of the water in the jacket and an expansion rod secured at one end in said shell and at the other end bearing against the valve to thrust it from its seat as it expands, the thermostat shell being closed to prevent circulation through it and the passage of fluid directly between the interior of the thermostat shell and the fluid chamber being prevented.

4. The combination of a water jacketed cylinder, means for supplying cooling water thereto, a spring seated valve to control the admission of the cooling water and a thermostatic valve controlling device comprising a thermostat shell uniting with the water jacket through a port at approximately the predetermined level of the water in the jacket and an expansion rod secured at one end in said shell and at the other end bearing against the valve to thrust it from its seat as it expands and means to unseat the valve by hand, the thermostat shell being closed to prevent circulation through it and the passage of fluid directly between the interior of the thermostat shell and the fluid chamber being prevented.

This specification signed and witnessed this 9th day of October, A. D., 1907.

CARL W. WEISS.

Signed in the presence of—
LUCIUS E. VARNEY,
AMBROSE L. O'SHEA.